United States Patent [19]

Kunkel

[11] Patent Number: 4,689,004
[45] Date of Patent: Aug. 25, 1987

[54] APPARATUS FOR ADHERING THERMALLY-SOFTENABLE PLASTIC PARTICLES INTO A PLASTIC BODY

[75] Inventor: Hans-Achim Kunkel, Reichelsheim, Fed. Rep. of Germany

[73] Assignee: Firma Carl Freudenberg, Weinheim, Fed. Rep. of Germany

[21] Appl. No.: 840,401

[22] Filed: Mar. 14, 1986

[30] Foreign Application Priority Data

Apr. 18, 1985 [DE] Fed. Rep. of Germany ....... 3514022

[51] Int. Cl.⁴ ............................................. B29C 33/52
[52] U.S. Cl. ...................................... 425/407; 264/51; 264/53; 264/125; 425/4 R; 425/387.1; 425/412
[58] Field of Search ................... 264/51, 53; 425/4 R, 425/817 R, 405 R, 406, 407, 408, 412, 445, 446, 387.1

[56] References Cited

U.S. PATENT DOCUMENTS 4,492,663 1/1985 Reinfeld et al. .................... 425/4 R

FOREIGN PATENT DOCUMENTS 7313244 11/1974 France ................................ 425/4 R
0109632 8/1980 Japan .................................. 425/4 R
197806 6/1978 Netherlands ....................... 425/4 R
1578045 10/1980 United Kingdom .

Primary Examiner—Willard E. Hoag
Attorney, Agent, or Firm—Felfe & Lynch

[57] ABSTRACT

Apparatus for adhering thermally-softenable particles to one another to form a plastic body has a molding tool reciprocable in a chamber for double piston action on a heated gas in the chamber. The molding tool defines a mold with opposite, gas-permeable walls in the directions of the reciprocation for receiving the particles. The double piston action of the reciprocation of the molding tool then forces the heated gas through the mold and particles therein to thermally soften the particles for adhering into the body.

20 Claims, 1 Drawing Figure

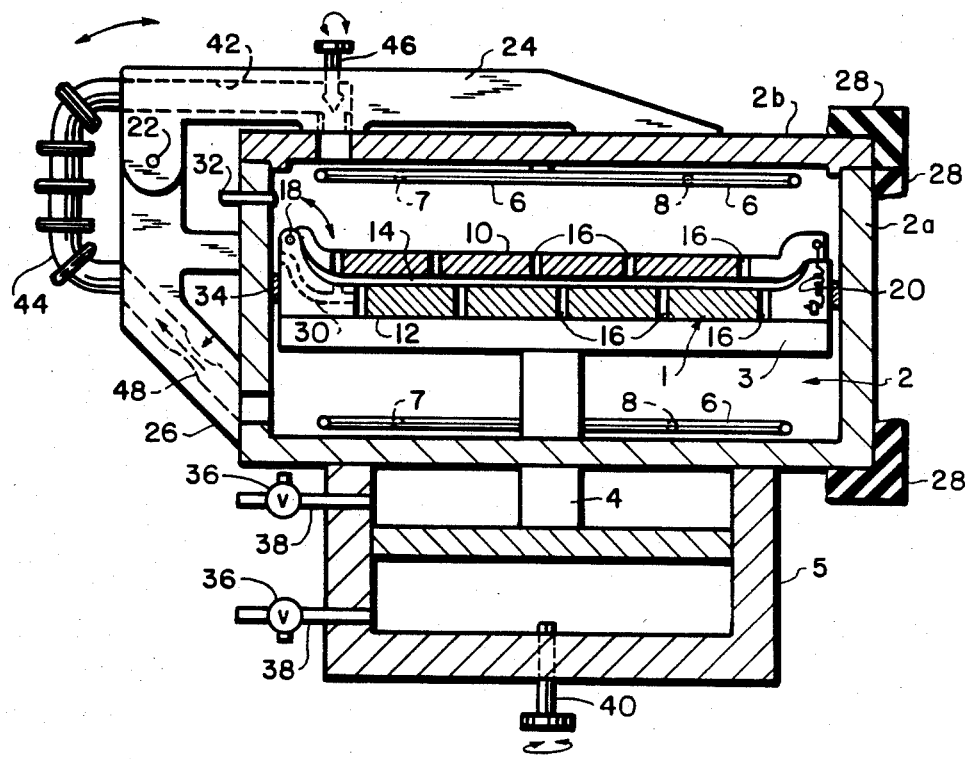

4,689,004

APPARATUS FOR ADHERING THERMALLY-SOFTENABLE PLASTIC PARTICLES INTO A PLASTIC BODY

BACKGROUND OF THE INVENTION

The invention relates to an apparatus for adhering thermally-softenable plastic particles to one another to form a plastic body, and more particularly, a molding tool defining a mold with opposite, gas-permeable walls for receiving loose plastic particles and, preferably, compressing the particles while a flow of a heated gas penetrates the gas-permeable walls of the mold and the loose, compressing particles therein for thermally softening them to adhere together.

U.K. Pat. No. 1,578,045 describes an apparatus having two, parallel, moving sieve bands which press together loose, thermally-softenable particles as they carry the pressed-together particles transversely through a nozzle dryer for thermally softening them to adhere together. The nozzle dryer includes a continuous, circular wind channel in which air is heated by heating elements and blown by blowers transversely through the mold formed of the two sieve bands always in the same direction.

The result is that thermally-softenable particles closer to the respective sieve bands are differently heat softened and molded by the sieve bands into the board. The board thus has both different smoothnesses on the, opposite surfaces molded by the respective sieve bands and an asymmetrical structure in its cross section between the surfaces. This presents problems.

The sieve bands also make it impossible to produce anything but columnar, board shapes. This is insufficient for many uses which, therefore, call for post-manufacture fabrication.

Both the sieve bands and the wind channel are, furthermore, bulky and require an appreciable investment. Neither is particularly acceptable, especially economically.

SUMMARY OF THE INVENTION

It is, therefore, an object of the invention to provide an apparatus for adhering thermally-softenable plastic particles into a plastic body of any desired shape with improved quality at reduced investment.

This and other objects are achieved according to the invention with an apparatus having an at least substantially-closed chamber for containing heated gas and a molding tool extending across the chamber for sufficient double piston action on the heated gas when moved in the chamber in opposite directions generally normal to the directions it extends across the chamber. A device, preferably a piston, is provided for moving the molding tool in the opposite directions.

The molding tool defines a mold with opposite, gas-permeable walls on its sides in the opposite directions for receiving thermally-softenable plastic particles in the mold. Sufficient double piston action on the heated gas is, therefore, sufficient to force at least some of the heated gas through the gas-permeable walls of the molding tool for thermally softening the plastic particles in the mold thereof sufficiently to adhere together. Preferably, the molding tool extends across the chamber sealingly and the chamber is closed for determining the heating of the plastic particles from the volume of the hot gas forced through the molding tool by its piston action and, thereby, the number of piston-action strokes.

Thermally softening the particles sufficiently to adhere together is, therefore, preferably performed in the same manner as in the apparatus described in the above-referenced U.K. patent by forcing a specific volume of heated gas through the interstices between the individual particles. This, however, is not based on an artificially produced movement of the gas which, in the invention, remains basically at rest in the chamber, but on the reciprocating movement of the molding tool for the piston action in the chamber. The apparatus according to the invention can thus be substantially smaller and less expensive than the apparatus described in the patent. This also lowers heat and energy use substantially.

In the simplest preferred embodiment of the apparatus according to the invention, the gas permeability and piston action of the molding tool are arranged for the hot gas to flow through the molding tool in the same manner from both of the opposite, gas permeable walls thereof. The thermal-softening, particle-adhering conditions are, in this case, absolutely identical on the corresponding, opposite sides of the mold. This is particularly desirable for using the molding that is obtained as an element of construction.

The apparatus according to the invention is suitable for producing moldings of any desired shape from thermally-softenable plastic particles, but it is especially suitable for producing moldings of large surface area, such as the headliner or an interior covering material for a motor vehicle. Both from static and from acoustical points of view, excellent characteristics of high uniformity can be achieved in such moldings.

The interior of the chamber should be easily accessible to permit easy loading and unloading of the molding tool. It has proven desirable in this regard for one end wall defining the chamber in one of the opposite directions of molding-tool movement for the piston action to be constructed and operatable in the manner of a hinged door. Charging the molding tool then is best performed when it is moved to a position close to this end wall.

The construction of the mold in the molding tool depends on the nature of the thermally-softenable plastic particles to be adhered together into the body. For example, the plastic particles may be particles of unfoamed or already-foamed plastic.

When the particles are foamed plastic, the size of the mold must be reduced at least after the surfaces of the particles thermally soften in order to achieve sufficient pressure between the particles for adhering them to one another. For this, one part of the mold can be defined by a partial piston which can be advanced compressingly toward the opposite part of the mold independently of the piston action of the molding tool. Mounting the partial or one-way piston in a guide within the molding tool is desirable in this case. The partial piston can be driven, in the simplest case, by springs.

When the plastic particles expand under the thermally-softening conditions by which they are adhered to one another as is the case, for example, with particles of only partially foamed plastic or particles which are completely unfoamed but contain a blowing agent which produces foaming under the thermally-softening conditions of adhering them together, the compression necessary for adhering the particles to one another and shaping the resulting body against the walls of the mold is a direct consequence of the foaming process that takes place under the thermally-softening conditions. Indeed, if there is sufficient expansion, the previously-described partial-piston arrangement of the molding tool may have to work in reverse, to expand the mold.

The moldings obtained are distinguished by especially-high surface quality. They can also be varied in shape in many of the ways known from a design point of view.

In the simplest case, the device for moving the molding tool back and forth in the chamber for the piston action can be a manually-operated handle projecting from the molding tool through a chamber wall because, surprisingly, neither an especially-long piston stroke nor any especially-great velocity of movement is necessary. Both can, however, affect the result. For achieving uniform results on a number of moldings, therefore, it has been found desirable for the reciprocating movement of the molding tool to be performed with great uniformity of both velocity and stroke and, for this, for the device to be power-driven. Good balancing of the motor-driven device prevents undesirable vibrations.

The thermal-softening and resulting adhering conditions for the plastic particles on opposite sides of the mold in the molding tool in the opposite directions of its piston-action movement can be varied in an especially simple manner by connecting the zones of the chamber adjoining the corresponding faces of the molding tool with an overflow passage having a variable cross section. Varying the cross section of the overflow passage will then vary the volume of the heated gas forced through the interstices between the particles independently of the velocity and/or stroke of the molding tool. The cross section of the overflow passage can be varied by simple devices. This makes it possible to establish precise thermal-softening and adhering conditions, which is considerably advantageous. Furthermore, such devices can make the cross section of the overflow passage larger for flow in the one direction than for flow in the other direction. The conditions for thermally-softening and adhering the plastic particles on the opposite sides of the mold in the molding tool then differ correspondly to give the finished molding a controlled, asymmetrical cross section. For a number of applications, this is a great advantage.

The same effect can be achieved, however, with an apparatus in which the molding tool can be moved faster in the one direction than in the other. The design of such an apparatus is generally slightly more complex than the overflow-passage apparatus described before, but it can be virtually noiseless in operation, and this is also worthy of consideration.

The molding tool can be separated from the surrounding walls of the chamber by a narrow gap or sealed thereto by conventional piston-sealing devices. The person skilled in the art is familiar with these and the many other possibilities in this regard for achieving sufficient piston action with the molding tool. When the molding tool is sealed to the chamber walls, however, it has been found desirable to separate the seal from guides for the movement of the molding tool in the opposite directions, especially in embodiments which produce very large moldings such as an average automobile headliner with an area of approximately 1.8 m$^2$ for example.

The molding tool and, thus, the mold therein should be easily permeable by the heated gas in the chamber. Accordingly, it can best be made of a sieve or perforated plate with an open-surface area of at least 40%. In order to achieve the stiffness also desired for the piston action of the molding tool, however, it has been found advantageous for such a sieve or perforated-plate molding tool to be borne by a gas-permeable supporting structure, such as a honeycomb-like skeleton structure or a ribbed structure.

The preferred power drive for reciprocating the molding tool is a piston driven electrically, hydraulically or pneumatically. The person skilled in the art is familiar with designs and controls for these. Consequently, they require no special explanation.

DESCRIPTION OF THE DRAWING AND PREFERRED EMBODIMENT THERESHOWN

A merely-exemplary, merely-preferred embodiment of apparatus according to the invention, which illustrates but does not limit the invention, is represented in elevation, partly in section and partly broken away, in the appended drawing. It is intended for producing an automobile headliner from partially-foamed polycarbonate particles.

The preferred embodiment shown in the drawing has a molding tool at 1 across a substantially closed chamber at 2. The chamber is defined by lower, box walls 2a and an upper lid 2b therefor. A molding tool is stiffeningly supported across the chamber, parallel to the lid on a central rib or beam structure 3. The beam structure is, in turn, supported on the rod of a piston 4 in a double-action pneumatic cylinder 5 for reciprocating the molding tool in opposite directions toward and away from the lid of the chamber and, thus, generally normal to the direction it extends across the chamber.

Gas in the chamber on the opposite sides of the molding tool corresponding to the directions of its pneumatically driven reciprocation is heated by hot oil-conducting radiators 6 on the lid and opposite, bottom sides of the chamber. The radiators receive hot oil circulation from inlet ducts 7 and outlet ducts 8.

The molding tool has a pair of perforated plates 10, 12 on the opposite sides corresponding to the directions of its pneumatically-driven reciprocation. The perforated plates are complementarily shaped to define a mold 14 in the space therebetween. The mold space is about 5.6 mm high between the perforated plates.

Each perforated plate has perforations 16 therethrough in the directions the molding tool reciprocates to make the molding tool gas permeable in the directions it reciprocates. To assure circulation of the gas in the mold space between the perforated plates, the perforations in the respective perforated plates 10, 12 are not aligned with each other. The perforations in each plate are about 4 mm in diameter.

The upper perforated plate 10 pivots on a guide or hinge 18 on one side of the lower perforated plate 12 to open the mold for receiving plastic particles to be adhered together into a plastic body into the mold. The upper perforated plate thus acts as a partial piston on the mold and the plastic particles therein. As later described, the plastic particles used in this case expand in the mold. To assure sufficient pressure for adhering the particles together and molding the resulting body in the mold, the side of the upper perforated plate opposite the hinge 18 has a spring hook 20 which hooks to a loop on the other perforated plate 12 for urging the perforated plates together and, thus, expansibly compressing the plastic particles in the mold.

In order to pivot the perforated plates apart on the hinge 18 when the spring 20 is unhooked for receiving the plastic particles into the mold, the lid 2b of the chamber is pivoted on hinge 22 between arms 24, 26 which respectively extend from the lid 2b and box walls 2a defining the chamber. The hinges are on the same side of the chamber to avoid interference between the perforated plate 10 and lid 2b when both are pivoted open, manually, for example.

Because the molding tool at 1 is permeable to the gas in the chamber at 2 which is heated by the radiators 6, the heated gas is maximally and, in this case, substantially all on the lower side of the molding tool, adjacent perforated plate 12, when the molding tool has moved maximally in the other direction toward the lid 2b. The lid is preferably opened with the molding tool in this, uppermost position for opening the mold to conserve the heat in the gas below the molding tool and for easy access to the mold. The heat in the gas is also conserved with insulation 28 which is shown only partially, but which surrounds the chamber.

When the molding tool is in the uppermost position, closest the lid and the lid and mold pivoted open, a plastic body previously molded is exposed on perforated plate 12 for removal. To facilitate removing the molded plastic body from the perforated plate 12 by cooling the body to unsoften it and urging its separation from the perforated plate 12, passages 30 (shown only partially) communicate with the mold 14 through perforated plate 12 and communicate with a passage 32 through the chamber box walls 2a when the molding tool is in the uppermost position for opening. Passage 32 then supplies unheated, compressed gas from a supply (not shown) to the passages 30 to cool and pneumatically lift the plastic body for removal from the mold surface of perforated plate 12. The unheated gas does not substantially enter the chamber below the perforated plate 12 to cool the heated gas retained therein, because the chamber adjacent the perforated plate 12 is closed.

A charge of thermally-softenable plastic particles can then be distributed on the mold surface of the perforated plate 12, the perforated plate 10 pivoted to close the mold 14 and spring 20 hooked to perforated plate 12 for partial piston action, and the lid 2d pivoted to close the chamber at 2. Pneumatic piston 4 and cylinder 5 then reciprocate the gas-permeable molding tool to force the heated gas through the molding tool and the thermally-softenable plastic particles in the mold therein with the piston action of the molding tool for softening the particles with the heated gas and adhering them into the plastic body. Piston action of the molding tool is encouraged by seal 34 which extends between the box walls 2a of the chamber and the molding tool thereacross. The seal 34 is a strip of felt.

The pneumatic piston 4 and cylinder 5 are actuated to reciprocate the molding tool for this by two-way valves 36 in conduits 38 at opposite ends of the cylinder. The valves alternately, oppositely and controllably connect the conduits 38 to a supply of compressed gas (not shown) and a vent. The valves thus pneumatically reciprocate the molding tool and control the stroke and speed of its reciprocation in each direction independently, but a mechanical stop 40 variably threaded through the cylinder or other stop controls may also be provided. Because the reciprocation effects the flow of heated gas through the mold, control of the reciprocation controls the heating of the plastic particles in the mold.

Further control of the flow of heated gas through the mold is provided by overflow passage 42 which extends from lid to the opposite end of the chamber for gas communication between the portions of the chamber on the opposite sides of the molding tool in the directions of its piston-action reciprocation by pneumatic piston 4 and cylinder 5. At least portion 44 of the overflow passage is flexible to accommodate opening of the lid. The rest of the overflow passage is, in this exemplary embodiment, in arms 24, 26.

A valve 46 is in the portion of the overflow passage in arm 24 to vary the cross section of the overflow passage for controlling bi-directional gas flow therethrough. The more gas flows through the overflow passage, the less it flows through the molding tool and the plastic particles in the mold therein. The valve 46 thus bi-directionally controls heating of the plastic particles with the heated gas in the chamber and, thus, symmetrically controls their adherence and molding into the plastic body in cross section between the perforated plates 10, 12.

An adjustable, directional throttle 48 in the portion of the overflow passage in arm 26 varies the cross section of the overflow passage in dependence on the direction of gas flow through the overflow passage to control the gas flow through the overflow passage differently in one direction than the other. This controls the adherence and molding of the plastic particles into the plastic body in cross section between the perforated plates, as with the valve 46, but asymmetrically, reciprocally to the directional control of the gas flow.

EXEMPLARY OPERATION

When the apparatus is in the closed condition shown in the drawing, 7.8 liters of partially-foamed polycarbonate particles having irregularly-shaped surfaces, an average diameter of from about 3 to about 5 millimeters, and a bulk weight of from about 15 to about 200 kilograms per cubic meter have been uniformly distributed in the mold 14. The perforated-plate mold halves assume a substantially uniform distance of 5.6 mm apart, corresponding to the shape of an automobile headliner of about 1.8 $m^2$. The perforations 16 are uniformly distributed, circular holes of a diameter of 2 mm to provide an open surface area to each of the perforated plates of about 48% of the total area.

The molding tool at 1, which is sealed against the circumferential walls of the chamber at 2 by the felt strips 34, then defines portions of the chamber adjoining the top and bottom of the molding tool which each contain a radiator 6. The radiators heat the air volume in each chamber portion to an average temperature of 260° C. in 5 seconds after the closing the lid 2b.

The valves 36 are then operated to give the molding tool a vertical, reciprocating movement with a stroke of such length that the piston alternately almost reaches the lid and opposite end of the chamber. The heated air thus flows through the interstices between the particles in alternate directions, causing a rapid heating of the particles. When the melting temperature of the polycarbonate polymer is reached, the blowing agent which it still contains brings about a considerably enlargement of the particles, and thus a strong pressure against one another and against the spring-closed, perforated-plate walls of the mold. The mold then finally becomes almost completely filled out, with the particles adhering together.

The cohesion of the individual particles necessarily reduces the free volume of the interstices as compared to the loose bulk material. The continued flow of heated gas through the porous structure while the piston and molding tool are moving up and down is thus restricted, i.e., as the piston and molding tool continue to move up and down, an increasingly greater pressure builds up against their movement. This pressure build-up is an indication of the welding or adhering together of the individual particles. The reciprocating movement, which produces the welding together of the particles, can thus be interrupted in response to the pressure at the right time without difficulty.

In order to avoid unnecessary energy looses, it has been found desirable to raise the molding tool as high as possible for the removal of the finished workpiece when the lid is pivoted open. The entire volume of the heated air is then underneath the molding tool, while cold, ambient air can flow in onto its upper side. The cooling of the finished workpiece is thus accelerated. It can be further accelerated at this time by introducing compressed air into passages 30 and, thus, between the perforated plate 12 and the finished workpiece. Since the chamber portion adjoining the bottom of the perforated plate 12 is enclosed on all sides, this air can escape only upwardly, against the workpiece. An injection of cold compressed air in this manner is therefore the most suitable method of removing excess heat swiftly and inexpensively.

It will be understood that the specification and examples are illustrative but not limitative of the present invention in that other embodiments within the spirit and scope of the invention will suggest themselves to those skilled in the art.

What is claimed is:

1. Apparatus for adhering thermally-softenable plastic particles to one another to form a plastic body, comprising:
   a substantially-closed chamber for containing heated gas and enclosing a mold;
   said mold having two mating mold halves, for receiving expandible particles, with perforated walls, the two halves being mounted for reciprocation within said chamber such as to cause heated gas to flow through the perforated walls when the mold halves are reciprocated within the chamber; and
   means for reciprocating the mold in opposite directions in the chamber.

2. The apparatus for claim 1, and further comprising means for sealing the mold to the chamber wall in at least one direction transverse to the reciprocation of the mold.

3. The apparatus of claim 1, and further comprising partial piston means in the mold for allowing one of the gas-permeable walls of the mold to move one of toward and away from the other.

4. The apparatus of claim 2, and further comprising partial piston means in the mold for allowing one of the gas-permeable walls of the mold to move one of toward and away from the other.

5. The apparatus of claim 4, wherein the partial piston means is operable independently of the means for moving the mold.

6. The apparatus of claim 5, and further comprising a guide in the mold for guiding the movement of the partial piston means and drive means on the mold for moving the partial piston means.

7. The apparatus of claim 6 wherein the drive means comprises a spring.

8. The apparatus of claim 1, wherein the means for moving the mold comprise a reciprocable piston and cylinder therefor.

9. The apparatus of claim 4, wherein the means for moving the mold comprise a reciprocable piston and cylinder therefor.

10. The apparatus of claim 1, and further comprising an overflow passage connecting the portions of the chamber on the opposite sides of the mold in the opposite directions the mold is moved in the chamber.

11. The apparatus of claim 10, and further comprising means varying the cross section of the overflow passage for controlling gas flow through the overflow passage at least one of bi-directionally and in dependence on the direction of gas flow.

12. The apparatus of claim 9, and further comprising an overflow passage connecting the portions of the chamber on the opposite sides of the mold in the opposite directions the mold is moved in the chamber.

13. The apparatus of claim 12, and further comprising means varying the cross section of the overflow passage for controlling gas flow through the overflow passage at least one of bi-directionally and in dependence on the direction of gas flow.

14. The apparatus of claim 9, and further comprising means for adjusting the stroke of the reciprocation of the piston in the cylinder therefor.

15. The apparatus of claim 8, and further comprising means for controlling at least one of the stroke and speed of the reciprocation of the reciprocable piston in the cylinder therefor.

16. The apparatus of claim 9, and further comprising means for controlling at least one of the stroke and speed of the reciprocation of the reciprocable piston in the cylinder therefor.

17. The apparatus of claim 13, and further comprising means for controlling at least one of the stroke and speed of the reciprocation of the reciprocable piston in the cylinder therefor.

18. The apparatus of claim 1, and further comprising a lid means for opening the chamber and means for opening the molding tool to the mold therein.

19. The apparatus of claim 17, and further comprising a lid means for opening the chamber and means for opening the molding tool to the mold therein.

20. The apparatus of claim 19, and further comprising means for heating the gas in the chamber and insulation about the chamber.

* * * * *